(12) United States Patent
Kabasawa (10) Patent No.: US 6,898,473 B2
(45) Date of Patent: May 24, 2005

(54) WIRE HARNESS DESIGN SUPPORT SYSTEM

(75) Inventor: Hiroshi Kabasawa, Kosai (JP)

(73) Assignee: Yazaki Corporation, Tokyo (JP)

( * ) Notice: Subject to any disclaimer, the term of this patent is extended or adjusted under 35 U.S.C. 154(b) by 200 days.

(21) Appl. No.: 10/442,997

(22) Filed: May 22, 2003

(65) Prior Publication Data

US 2004/0019399 A1 Jan. 29, 2004

(30) Foreign Application Priority Data

May 22, 2002 (JP) .................................. 2002-147338

(51) Int. Cl.$^7$ .......................... B60R 16/02; G06F 19/00
(52) U.S. Cl. ...................... 700/97; 700/117; 700/213; 29/729
(58) Field of Search ........................ 700/97, 115, 117, 700/213; 29/33 F, 729, 748, 749

(56) References Cited

U.S. PATENT DOCUMENTS

| | | | | | |
|---|---|---|---|---|---|
| 4,476,629 | A | * | 10/1984 | Suzuki et al. ................ | 29/863 |
| 5,168,904 | A | * | 12/1992 | Quinkert .................... | 140/92.1 |
| 6,169,934 | B1 | * | 1/2001 | Nakayama et al. ......... | 700/213 |
| 6,195,884 | B1 | * | 3/2001 | Miyamoto et al. .......... | 29/857 |
| 6,330,746 | B1 | * | 12/2001 | Uchiyama et al. .......... | 29/872 |
| 6,694,203 | B2 | * | 2/2004 | Wada et al. ................. | 700/97 |
| 6,842,173 | B2 | * | 1/2005 | Sakakura et al. ........... | 345/419 |
| 6,845,553 | B2 | * | 1/2005 | Akizuki et al. .............. | 29/749 |

FOREIGN PATENT DOCUMENTS

| | | |
|---|---|---|
| DE | 100 29 086 A1 | 1/2002 |
| EP | 0 967 122 A2 | 12/1999 |
| JP | 2001-250438 | 5/1990 |
| JP | 2000-163453 | 6/2000 |
| JP | 2001-251740 | 9/2000 |
| JP | 2001-251741 | 9/2000 |

\* cited by examiner

Primary Examiner—Jayprakash N. Gandhi
(74) Attorney, Agent, or Firm—Sughrue Mion, PLLC (57) ABSTRACT

The object of the invention is to provide a wire harness design support system that suitably corresponds to the frequent modification of design and enhances the design efficiency of a jig plate layout and a path layout draft in accordance with it. To achieve the object, guide information calculated based upon a request for modification from a car manufacturer for guiding a modifiable location of a jig plate layout is added to the jig plate layout and it is output. Besides, the jig plate layout can be modified according to an instruction to modify the jig plate layout utilizing the guide information. Further, a path layout draft that reflects the modification of the jig plate layout is also output.

13 Claims, 13 Drawing Sheets

WIRE HARNESS DESIGN SUPPORT SYSTEM

BACKGROUND OF THE INVENTION

The present invention relates to a wire harness design support system, particularly relates to a design support system of the path layout and the jig plate layout of a wire harness.

The design of a wire harness wired in a vehicle is prepared in parallel with the design of the vehicle in which the wire harness is wired. Normally, a demand for the path layout of a wire harness is made from a manufacturer of a vehicle (merely called a car manufacturer) and a part manufacturer receives the demand and manufactures a wire harness that meets the demand.

That is, in a production preparation period, the car manufacturer repeatedly reviews the modification of a model and specifications and provides related information to the part manufacturer every time. In the meantime, after the part manufacturer designs the layout of a jig plate for manufacturing a wire harness demanded by the car manufacturer in consideration of the current jig plate layout, owned jigs and manufacturing efficiency, it proposes a path layout draft of a manufacturable wire harness according to the jig plate layout to the car manufacturer. The car manufacturer reviews the acceptance of the path layout draft and informs the part manufacturer of the result. In the production preparation period, such communication is repeated between the car manufacturer and the part manufacturer.

However, in the determined production preparation period, the part manufacturer is required to frequently modify the design of a jig plate layout and a path layout draft according to the information of modification from the car manufacturer. Besides, the quantity of documents and drawings related to the modification is also enormous. Under such a situation, the part manufacturer demands enhancing the design efficiency of a jig plate layout and a path layout draft respectively to be frequently modified.

SUMMARY OF THE INVENTION

Therefore, the invention is made in view of the current situation and the object is to provide a wire harness design support system that suitably corresponds to the frequent modification of design and enhances the design efficiency of a jig plate layout and a path layout draft in accordance with it, a wire harness design support method and a computer readable recording medium storing a program thereof.

In order to solve the aforesaid object, the invention is characterized by having the following arrangement.

Aspect 1 A wire harness design support system for supporting designing a path layout of a wire harness wired in a predetermined location and a jig plate layout for manufacturing the wire harness, comprising:

a path data storing unit for storing at least current path data related to a current path layout;

a jig plate data storing unit for storing at least current jig plate data related to a current jig plate layout;

a path data acquiring unit for acquiring new path data related to a new path layout in which modification is required;

a difference information detecting unit for comparing the new path data and the current path data and detecting difference information between both data; and a current jig plate layout output unit for adding information which is calculated based upon the difference information and has an effect upon the current jig plate layout, to the current-jig plate layout calculated based upon the current path data, and outputting the current jig plate layout to which the information is added.

Aspect 2 The wire harness design support system according to the aspect 1, further comprising:

a new jig plate layout output unit for outputting a new jig plate layout calculated based upon the new path data; and a modification guide information output unit for adding guide information for guiding a modifiable location calculated based upon the difference information, to the new jig plate layout, and outputting the new jig plate layout to which the guide information is added.

Aspect 3 The wire harness design support system according to the aspect 2, further comprising:

a modification unit for modifying the new jig plate layout according to an instruction to modify the new jig plate layout utilizing the guide information.

Aspect 4 The wire harness design support system according to the aspect 3, further comprising:

a path layout draft output unit for outputting a path layout draft that reflects modification in the new jig plate layout.

Aspect 5 The wire harness design support system according to the aspect 4, wherein:

the path layout draft output unit outputs the path layout draft based upon information of material characteristics of a wire harness estimated based upon the new path layout.

Aspect 6 The wire harness design support system according to the aspect 5, further comprising:

a length information output unit for adding length information to the path layout draft when length of the wire harness is modified in the new path layout and outputting the path layout drat to which the length information is added.

Aspect 7 A wire harness design support system for supporting designing a path layout of a wire harness wired in a predetermined location and a jig plate layout for manufacturing the wire harness, comprising:

a path data storing unit for storing at least current path data related to a current path layout;

a jig plate data storing unit for storing at least current jig plate data related to a current jig plate layout;

a path data acquiring unit for acquiring new path data related to a path layout the modification of which is required;

a difference information detecting unit for comparing the new path data and the current path data and detecting difference information between both data;

a new jig plate layout output unit for outputting a new jig plate layout calculated based upon the new path data; and a modification guide information output unit for adding guide information for guiding a modifiable location calculated based upon the difference information of the new jig plate layout, to the new jig plate layout, and outputting the new jig plate layout to which the guide information is added.

Aspect 8 The wire harness design support system according to the aspect 7, further comprising:

a modification unit for modifying the new jig plate layout according to an instruction to modify the new jig plate layout utilizing the guide information.

Aspect 9 The wire harness design support system according to the aspect 8, further comprising:

a path layout draft output unit for outputting a path layout draft that reflects modification in the new jig plate layout.

Aspect 10 The wire harness design support system according to the aspect 9, wherein:

the path layout draft output unit outputs a path layout draft based upon information of the material characteristics of a wire harness estimated based upon the new path layout.

Aspect 11 The wire harness design support system according to the aspect 10, further comprising:

a length information output unit for adding length information to the path layout draft when length of the wire harness is modified in the new path layout, and outputting the new path layout draft to which the length information is added.

Aspect 12 A method of supporting designing a path layout of a wire harness wired in a predetermined location and a jig plate layout for manufacturing the wire harness, comprising the steps of:

a path data storing step of storing at least current path data related to a current path layout;

a jig plate data storing step of storing at least current jig plate data related to a current jig plate layout;

a path data acquiring step of acquiring new path data related to a new path layout in which modification is required;

a difference information detecting step of comparing the new path data and the current path data and detecting difference information between both data; and a current jig plate layout output step of adding information which is calculated based upon the difference information and has an effect upon the current jig plate layout, to the current jig plate layout calculated based upon the current path data, and outputting the current jig plate layout to which the information is added.

Aspect 13 A computer readable recording medium storing a program for supporting designing a path layout of a wire harness wired in a predetermined location and a jig plate layout for manufacturing the wire harness, the program causing a computer to execute the steps of:

a path data storing step of storing at least current path data related to a current path layout;

a jig plate data storing step of storing at least current jig plate data related to a current jig plate layout;

a path data acquiring step of acquiring-new path data related to a new path layout in which modification is required;

a difference information detecting step of comparing the new path data and the current path data and detecting difference information between both data; and a current jig plate layout output step of adding information which is calculated based upon the difference information and has an effect upon the current jig plate layout, to the current jig plate layout calculated based upon the current path data, and outputting the current jig plate layout to which the information is added.

DETAILED DESCRIPTION OF THE PREFERRED EMBODIMENT

Referring to the drawings, an embodiment according to the invention will be described below.

Figure 1:
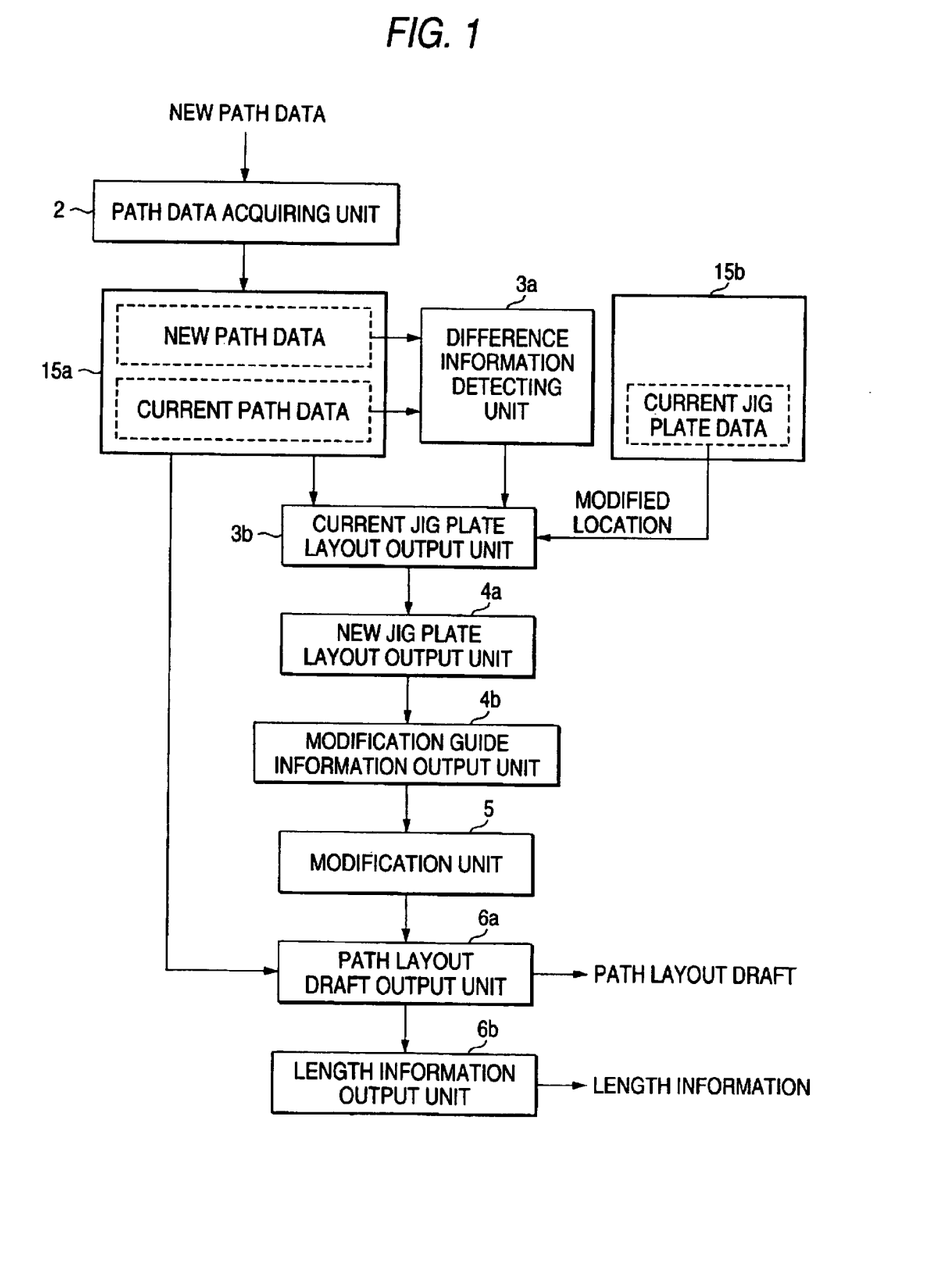
FIG. 1 is a block diagram showing the basic configuration of a wire harness design support system according to the invention.
Figure 2:
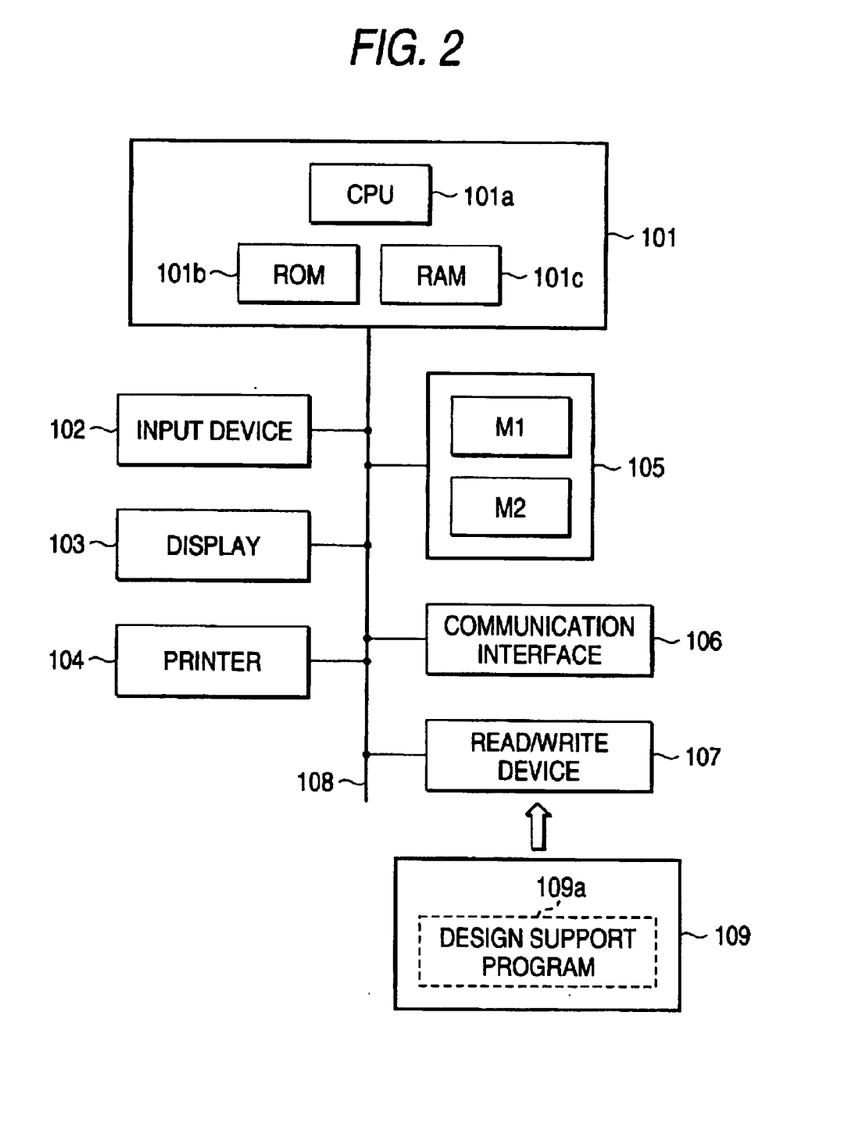
FIG. 2 is a block diagram showing hardware configuration according to the embodiment.

First, the configuration of hardware according to the embodiment will be described. FIG. 2 is a block diagram showing the configuration of the hardware according to the embodiment. The embodiment will be described hereinafter using a part manufacturer that provides a predetermined wire harness to a car manufacturer as an example.

As shown in FIG. 2, in the embodiment, a design support system basically including a microcomputer 101, an input device 102, a display 103, a printer 104, a storage 105, a communication interface 106 and a read/write memory 107 is used. The configuration as hardware of the design support system can be embodied by a well-known desktop computer. The microcomputer 101 includes a central processing unit (CPU) 101a, ROM 101b that stores a boot program and RAM 101c that temporarily stores the result of processing. The input device 102 is a keyboard and a mouse for inputting each value, the display 103 is CRT for displaying the result of processing and the printer 104 is a printer for printing the result of processing. The storage 105 corresponds to a path data storing unit (105a) and a jig plate data storing unit (105b) respectively in claims, is actually a hard disk that stores the result of processing and is provided with storage regions M1, M2 respectively described later. The communication interface 106 is a modem board for data communication with the car manufacturer using a dedicated line for example. The read/write device 107 is a device for reading a design supporting program 109a according to the present invention from a recording medium 109 such as CR-ROM, reading data from a portable record medium on which path layout data and modification information respectively provided from the car manufacturer are stored and writing the layout of a jig plate calculated in the system and a draft of the layout of a path to be proposed to the car manufacturer to the portable record medium for example. Each component is connected via an internal bus 18. CPU 101a is activated according to the bootstrap stored in ROM 101b and is operated according to an application program telling a procedure in the embodiment. The procedure in the embodiment and an example of output respectively executed by such a design support system will be described below.

The microcomputer 101 installs the design supporting program 109a read from the read/write device 109 into, for example, the storage 105. After power on the computer, the microcomputer 101 is activated according to the boot program stored in the ROM 101b and starts the installed design supporting program. According to the design supporting program, the microcomputer 101 designs the path layout and jig plate layout of the wire harness, can output these results on the display device 103 or the printer 104 and can stores these results in the storage 105. The design support program 109a is capable of being installed in any personal computer which has the above basic construction, and after installing the program, the computer functions as the design supporting apparatus (it can be called design support system). Further, the design support program 109 is provided not only through the recording medium 109 but also may be provided though the communication line such as Internet and LAN.

Figure 3:
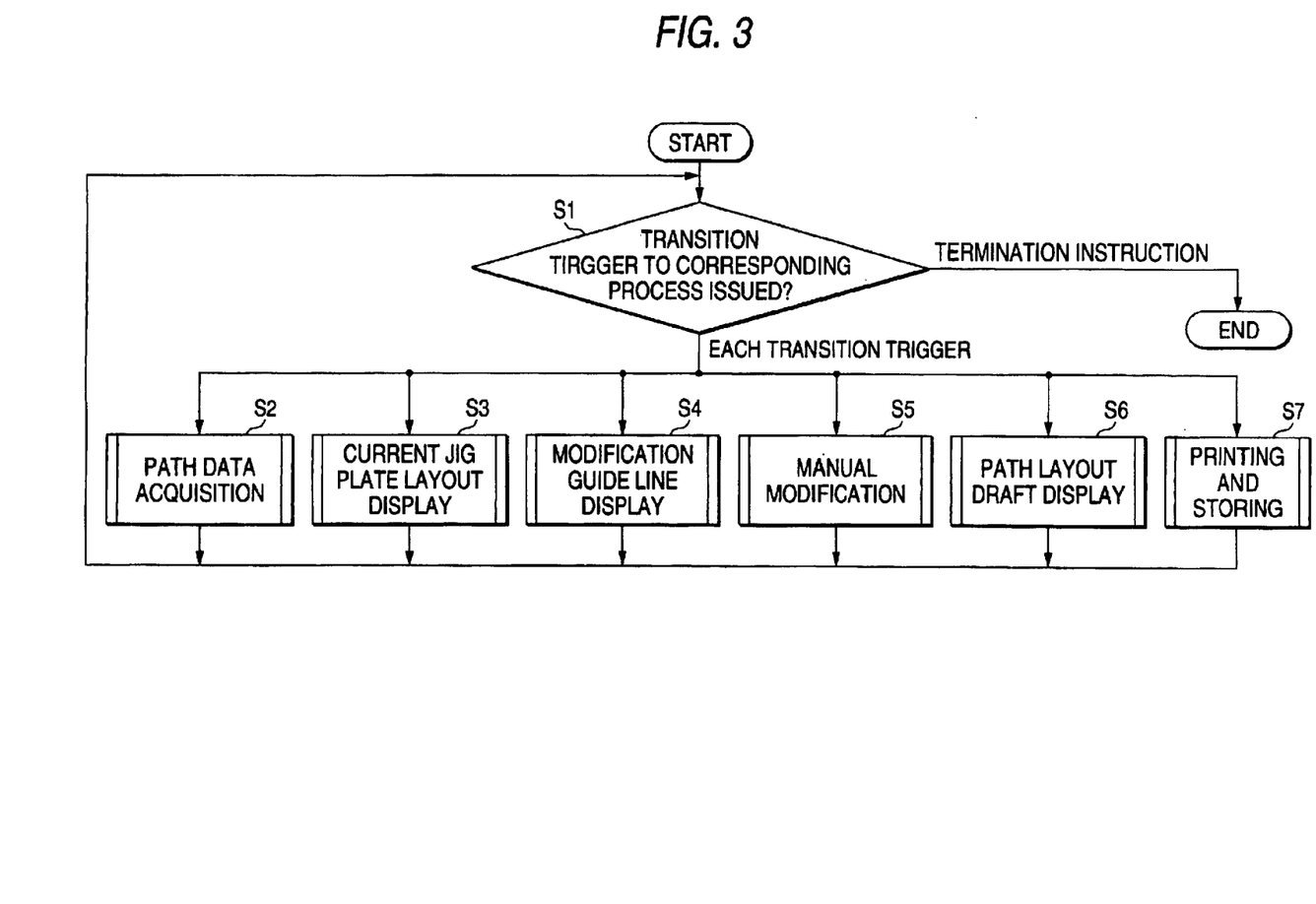
FIG. 3 is a flowchart showing a basic procedure in the embodiment.

Referring to FIG. 3, the basic procedure related to the embodiment will be first described below. FIG. 3 is a flowchart showing the basic procedure according to the embodiment executed by the design support system.

After a power source of this system is turned on, predetermined initialization is finished and an initial screen is displayed, a transition trigger to corresponding processing is on standby. In a step S1 in FIG. 3, control is transferred to the processing corresponding to the transition trigger to the corresponding processing. The transition trigger means a button object displayed on the screen of the display 103 for proceeding to the corresponding processing for example. In case a termination instruction is issued, the processing is finished after predetermined processing for termination is executed, however, in case a transition trigger except it is issued, control is transferred to the corresponding processing.

Figure 4A:
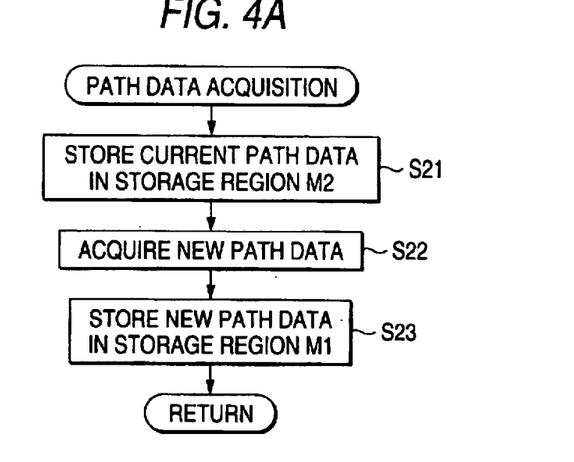
FIGS. 4A to 4E are flowcharts showing a procedure of each subroutine shown in FIG. 3.

In a path data acquisition process in a step S2, new path data related to the path layout of the wire harness the modification of which is required is acquired. The modification includes the change of the position of a connector by the change of a vehicle model on the side of the car manufacturer. Referring to FIG. 4A, this will be described later.

Figure 4B:
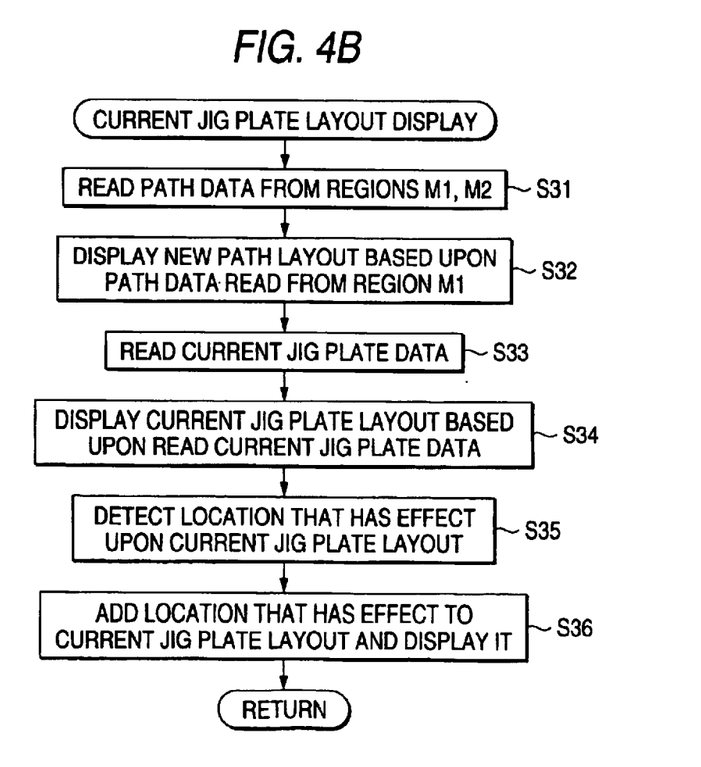

In a process for displaying the current layout of the jig plate shown in a step S3, the new layout data and the current path data are basically compared and the difference information between both data is detected. Information which has an effect upon the current layout of the jig plate and which is calculated based upon the difference information is added to the layout of the jig plate calculated based upon the current path data and it is displayed. Referring to FIG. 4B, this will be described later.

Figure 5:
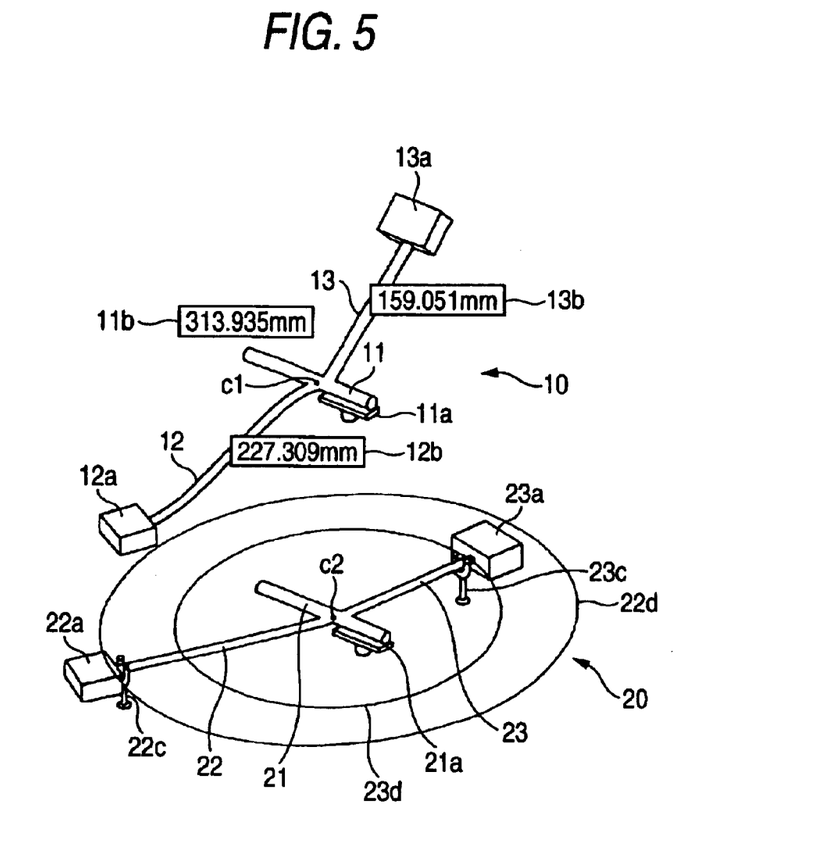
FIG. 5 shows a basic display example in the embodiment.

Referring to FIG. 5, a basic display example of the embodiment will be described below. FIG. 5 shows the basic display example of the embodiment. The display examples of the embodiment are displayed on the screen provided by Windows which is an operating system provided by Microsoft for example. As shown in FIG. 5, a path layout 10 is displayed on the upside of the screen of the display 103 and a current jig plate layout 20 is displayed on the downside of the screen. These are displayed on the screen as an image by three-dimensional computer aided design (CAD).

The path layout 10 is calculated and displayed based upon three-dimensional positional information included in path data provided by the car manufacturer for example. From the path data, for example, the diameter and the length of the wire harness, the shape and the position of a connector and a clamp as a supporting member connected to the end and the center of the wire harness can be also acquired.

As shown in FIG. 5, for the path layout 10, a trunk 11 wired to a predetermined region of a vehicle, twigs 12, 13 branched from a junction C1 and connectors 12*a*, 13*a* are displayed as a wiring image. The information 11*b*, 12*b*, 13*b* of each length of the trunk 11 and the twigs 12, 13 can be also displayed together. A reference number 11*a* denotes a reference level.

In the meantime, the jig plate layout 20 can be also calculated based upon the three-dimensional positional information included in the path data. However, in this case, it is supposed that the wire harness is extended on the substantially flat jig plate. In the calculated jig plate layout 20, the wire harness is displayed in a state in which the wire harness is extended on the jig plate and is mounted on jigs 22*c*, 23*c* utilized when the wire harness is manufactured as shown in FIG. 5. As clarified when the jig plate layout 20 is compared with the path layout 10, an angle of each twig 22, 23 branched from a junction C2 with a trunk 21 is different in the jig plate layout 20 from that in the path layout 10. Further, a range in which each connector 22*a*, 23*a* can be moved is displayed by each concentric circle 22*d*, 23*d* having the junction C2 in the center. The information of the jig plate and a usable jig is stored in the storage 105 beforehand.

The trunk 21, the twigs 22, 23, a reference level 21*a* and the connectors 22*a*, 23*a* in the jig plate layout 20 correspond to the trunk 11, the twigs 12, 13, the reference level 11*a* and the connectors 12*a*, 13*a* in the path layout 10. The calculated jig plate layout 20 is read and can suitably displayed by storing the calculated jig plate layout in the storage 105 as the current jig plate data. The path layout 10 and the jig plate layout 20 shall be displayed in white for example.

Figure 4C:
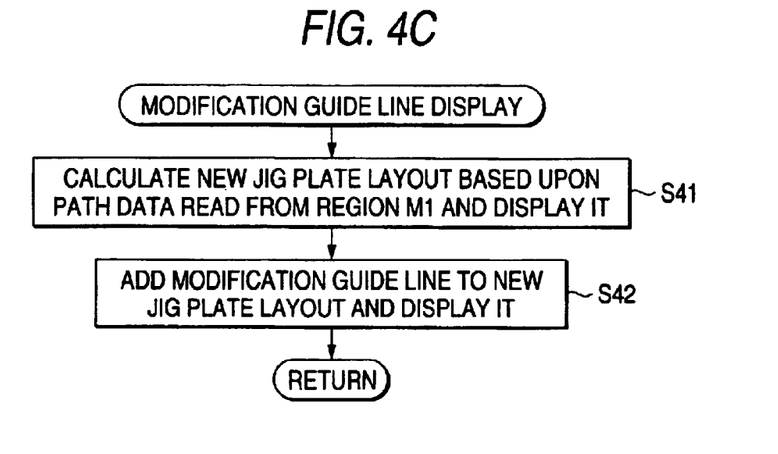

In a modification guide line display process shown in a step S4, a new jig plate layout calculated based upon the path data acquired in the step S2 is basically output, guide information for guiding a modifiable location calculated based upon the difference information in the new jig plate layout is added to the jig plate layout and it is displayed. Referring to FIG. 4C, this will be described later.

Figure 4D:
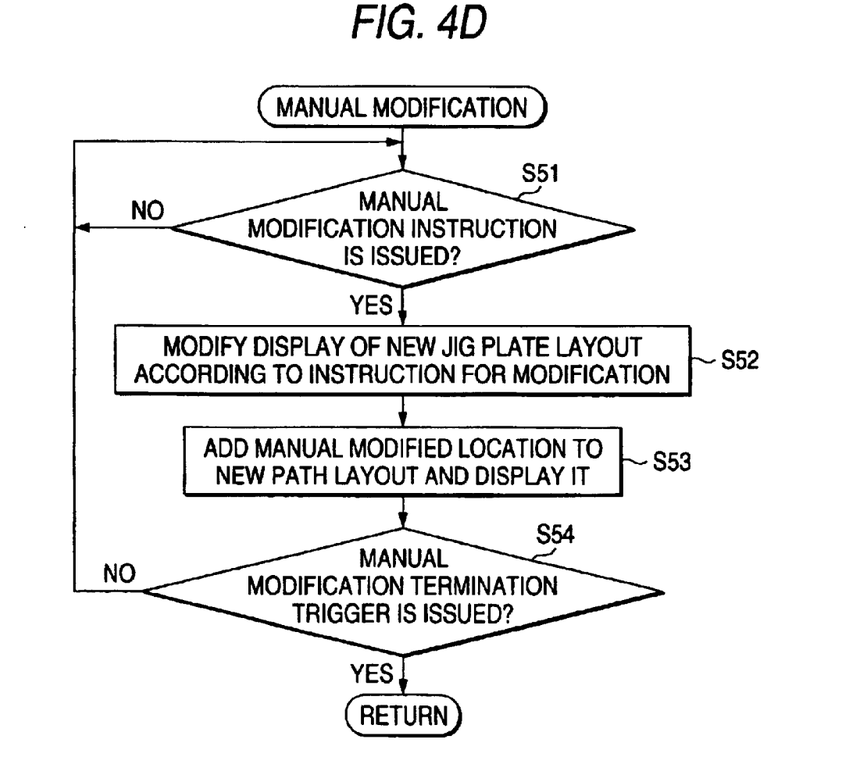

In a manual modification process shown in a step S5, the jig plate layout is basically suitably modified according to the guide information displayed in the step S4 using the input device 102 and it is displayed. Besides, a path layout draft to which the modification is added is also displayed. Referring to FIG. 4D, this will be described later.

Figure 4E:
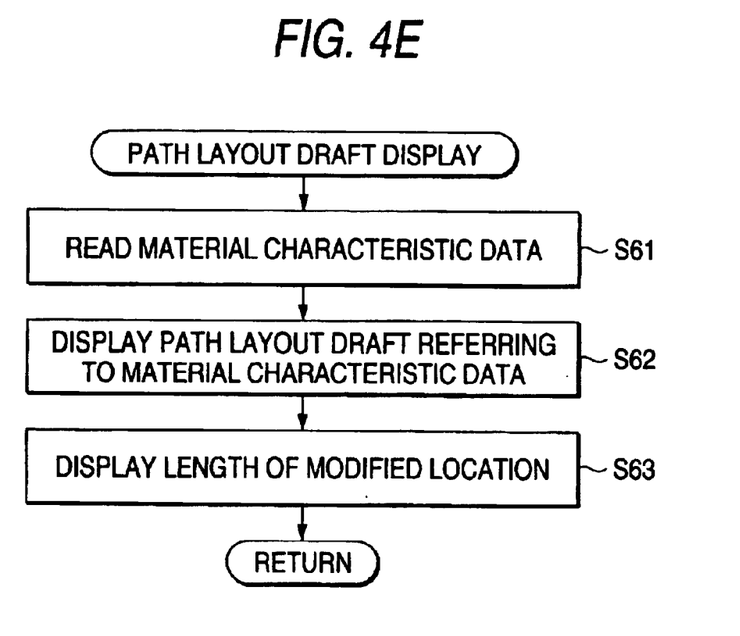

In a path layout draft display process shown in a step S6, a path layout draft in which the information of the material characteristics of the wire harness is added to the result of the modification according to an instruction for manual modification in the step SS is basically displayed. Besides, the length information of a modified location can be also added. Referring to FIG. 4E, this will be described later.

In a process for printing and storing shown in a step S7, the result acquired in each process shown in the steps S3 to S6 is output on paper by the printer 104, is stored in the storage 105 with a specific file name and is written to a portable record medium via the read/write memory 107. For these processing, a well-known procedure is available.

In the embodiment, each process shown in the steps S2 to S6 shall be executed by a predetermined transition trigger basically in the order. However, the step S7 can be suitably executed even if each process in the steps S2 to S6 is being executed.

Next, referring to FIGS. 4 to 11, a procedure of each subroutine shown in FIG. 3 and display examples acquired in the process will be described. FIGS. 4A to 4E are flowcharts respectively showing a procedure of each subroutine shown in FIG. 3. FIGS. 5 to 11 show output examples acquired in the procedures shown in FIG. 3. In this case, jig plate data and path data which can be displayed as the layouts shown in FIG. 5 shall be already stored in the storage 105.

In the path data acquisition process shown in FIG. 4A, new path data provided from the car manufacturer for example and related to a path layout the modification of which is required is acquired via the communication interface 106 or the read/write memory 107. At least the three-dimensional positional information of the trunk and the twigs of the wire harness showing a new path layout is included in the path data. To store the path data in the storage region M1 allocated in the storage 105, the current path data in the storage region M1 is transferred to the storage region M2 in a step S21 and new path data acquired in a step S22 is stored in the storage region M1 in a step S23. As a result, the new path data acquired at this time is stored in the storage region M1 and the path data acquired last time is stored in the storage region M2. The step S22 and related hardware correspond to a path data acquiring unit in claims.

Figure 6:
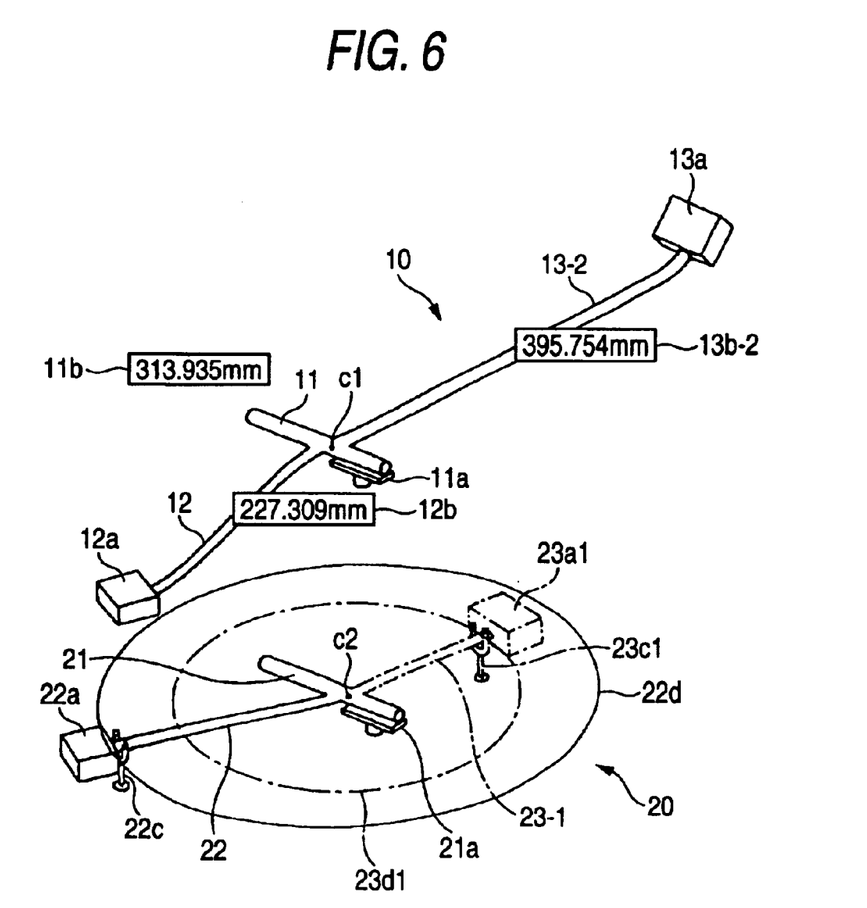
FIG. 6 shows a display example related to a current jig plate layout display process.

In the current jig plate layout display process shown in FIG. 4B, first, in a step S31, the path data described above are read from the storage regions M1, M2. Next, in a step S32, a path layout 10 shown in FIG. 6 is displayed on the display 103 based upon the path data read from the storage region M1, that is, the new path data. The display of the path layout 10 is performed as in the method described referring to FIG. 5. However, the path layout 10 shown in FIG. 6 shows that the position and the length of the twig 13 shown in FIG. 5 are modified as shown as a twig 13-2. The information of the modified length 13b-2 can be simultaneously displayed. As the other locations are not modified, the similar display to the display in the path layout shown in FIG. 5 is made.

Next, in a step S33, the current jig plate data stored in the storage 105 is read and in a step S34, a current jig plate layout 20 shown in FIG. 6 is displayed based upon the read jig plate data. The jig plate layout 20 is similar to the layout shown in FIG. 5 at this time.

Next, in a step S35, both path data read from the storage regions M1, M2 are compared and the difference information between both data is detected. Further, locations that have an effect upon the current jig plate layout 20 are detected based upon the difference information. In a step S36, the locations that have the effect are added to the current jig plate layout 20 and it is displayed. That is, as shown in jig plate layout 20 in FIG. 6, the respective corresponding connector 23a1, jig 23c1 and twig 23-1 are displayed in red for example so that the locations that have the effect can be discriminated from locations except them. Locations that have no effect still remain white for example. A concentric circle 23d1 with a junction C2 in the center corresponding to the connector 23a1 is also displayed in red. Hereby, locations to be modified in the current jig plate layout can be easily recognized and the design efficiency of anew jig plate layout is enhanced. A trunk name and a twig name are also simultaneously displayed and the information of modification may be also related to the trunk name and the twig name by a character. In this case, the trunk name and the twig name shall be included in the path data. Hereby, even if a new path layout provided from the car manufacturer includes no twig, the correspondence is facilitated. The step S35 and related hardware correspond to a difference information detecting unit in the claims, and the step S36 and related hardware correspond to current jig plate layout output unit in the claims.

Figure 7:
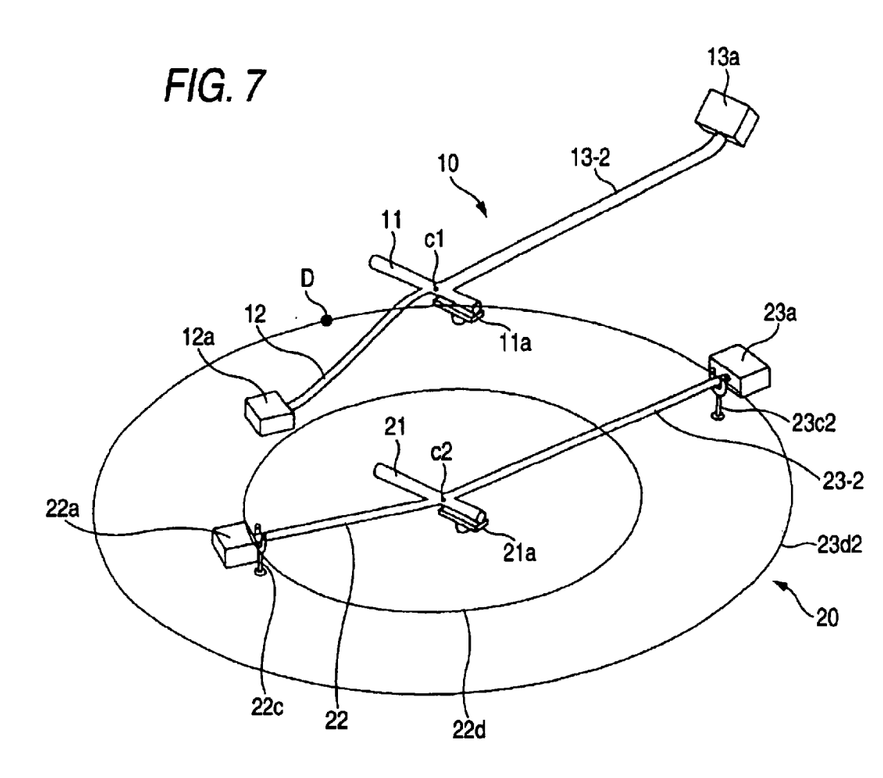
FIG. 7 shows a display example related to a modification guide line display process.

In the modification guide line display process shown in FIG. 4C, first, in a step S41, a new jig plate layout 20 shown in FIG. 7 is displayed on the display 103 based upon path data read from the storage region M1, that is, new path data in place 15 of the jig plate layout shown in FIG. 6. When the new jig plate layout 20 is displayed, the similar processing to that described referring to FIG. 5 is executed. The jig plate layout 20 shown in FIG. 7 shows that as a result of changing the position of the connector 23a shown in FIG. 5, a twig is modified as shown by 23-2.

Next, in a step S42, a red concentric circle with a junction C2 in the center corresponding to a connector 23a is displayed on the display 103 as a modification guide line 23d2 in place of the concentric circle 23d. The modification guide line 23d2 may be also in color except red if the concentric circuit has only to be discriminated from another concentric circle. The modification guide line 23d2 shows a range in which the connector 23a the position of which is changed can be moved. Therefore, a new jig plate layout can be easily designed according to the modification guide line 23d2 and the design efficiency is enhanced. The step S41 and related hardware correspond to a new jig plate layout output unit in the claims, and the step S42 and related hardware correspond to a modification guide information output unit in the claims. The modification guide line 23d2 corresponds to modification guide information In the manual modification process shown in FIG. 4D, in a step S51, it is inquired whether a manual modification instruction is issued or not. The manual modification instruction can be issued by dragging the connector 23a shown in FIG. 7 to a target point D to be modified using a mouse as the input device 102 for example. When the manual modification instruction is issued, control is transferred to a step S52 (Y in the step S51).

Figure 8:
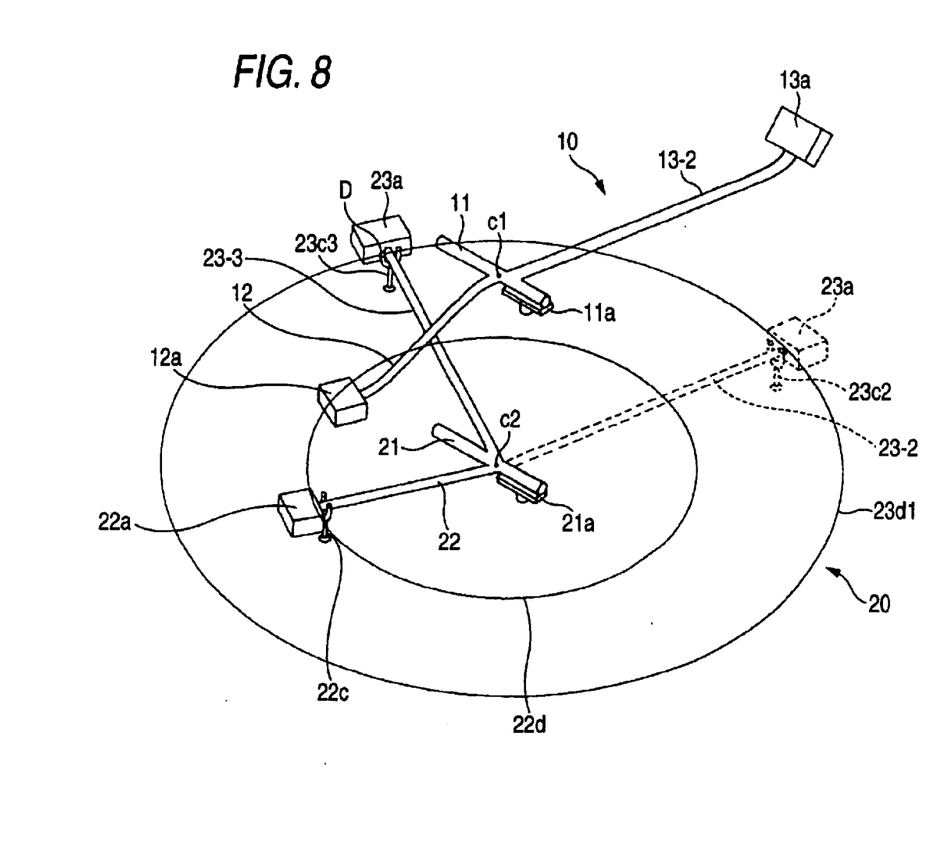
FIG. 8 shows a display example related to a manual modification process.
Figure 9:
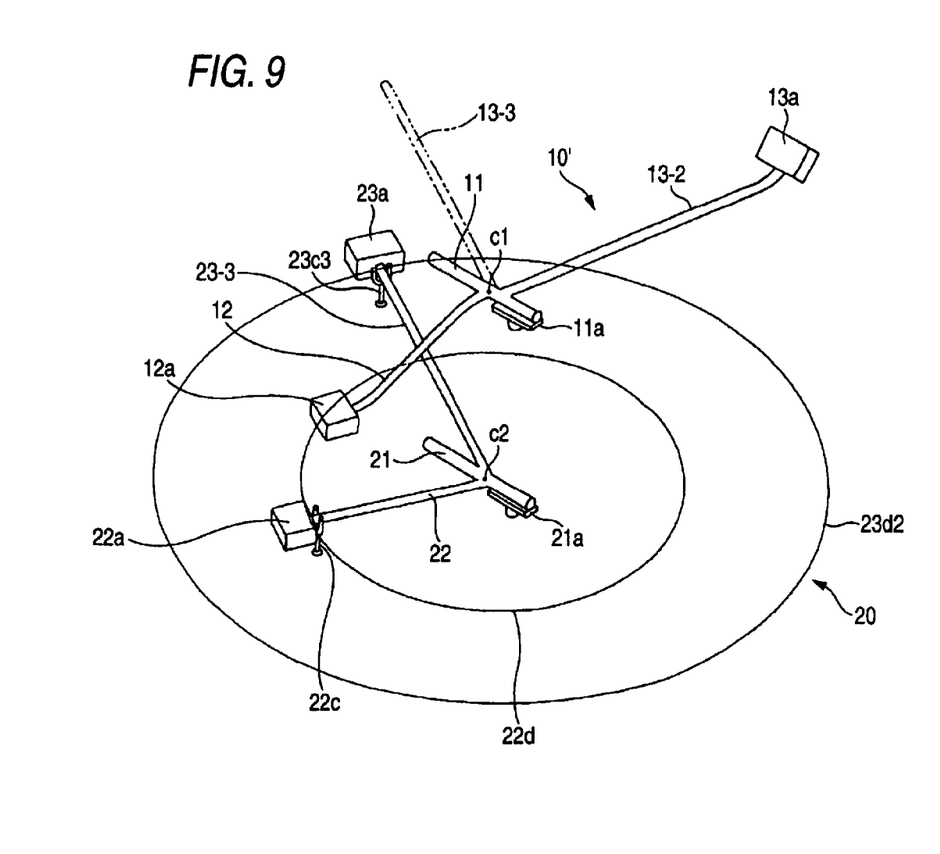
FIG. 9 shows a display example related to the manual modification process.
Figure 10:
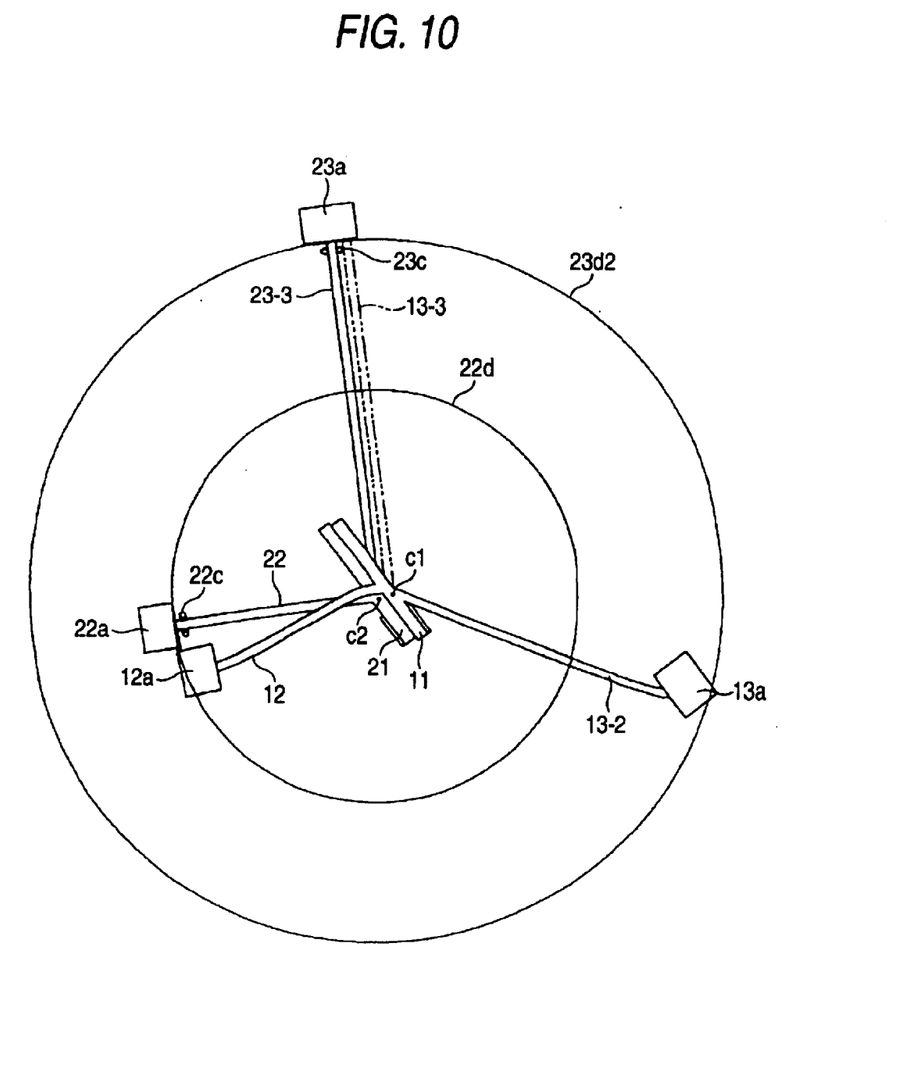
FIG. 10 shows a display example related to the manual modification process.

In the step S52, the connector 23a is moved to the position of the target point D to be modified according to the modification instruction as shown in FIG. 8 and hereby, the display of the jig and the twig is also modified as shown by 23c3 and 23-3. The modification can be also reflected in the path layout by clicking the button object. That is, in a step S53, a path layout 10' in which the twig 23-3 the position of which is changed as shown by 13-3 in FIG. 9 is added to the path layout 10 shown in FIG. 8 and others is displayed. The reference number 13-3 denotes the twig after modification and the twig is displayed in yellow for example so that the effect can be discriminated. Further, a plan in which the jig plate layout is overlapped with the path layout can be also displayed as shown in FIG. 10 by dragging the jig plate layout. Hereby, the review and the adjustment of an angle of the twig with the trunk are facilitated. The jig plate layout and the path layout are mutually linked and can be displayed in a perspective view shown in FIG. 9 or in the plan shown in FIG. 10.

Such a manual modification process can be continued until a predetermined manual modification termination trigger is issued by clicking the button object in a step S54. As described above, as the jig plate layout can be modified by manual operation, the review of an optimum jig plate layout is facilitated. The step S52 shown in FIG. 4D and related hardware correspond to modification unit in claim, and the step S53 and related hardware correspond to a path layout draft output unit in claim.

In the path layout draft display process shown in FIG. 4E, in a step. S62, a path layout draft 10" shown in FIG. 11 is calculated and can be also displayed on the display 103 based upon the material characteristic data of the wire harness estimated based upon the three-dimensional positional information (that is, the thickness and the length of the trunk and the twig) of the trunk and the twig of the wire harness corresponding to a new path layout provided from the car manufacturer in a step S61 (corresponds to claim 6).

Figure 11:
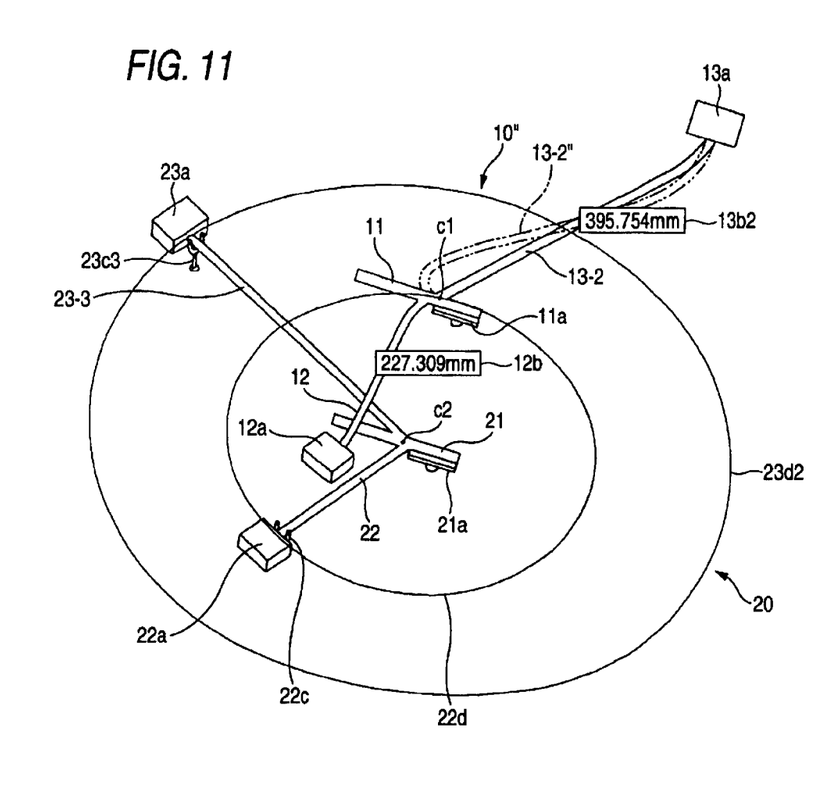
FIG. 11 shows a display example related to a path layout draft display process.

Detailedly, when a twig 13-2" is required to be branched in a direction shown in the jig plate layout 20 in FIG. 11 as a result of the manual modification process shown in FIG. 4D in consideration of relation with the already existing jigs on the jig plate, the path layout draft that meets both the branched direction and the condition of constraint such as the position and the direction respectively requested of the connector is required to be created. However, as the wire harness includes a power supply line and a control line, it cannot be freely bent. Then, the path layout draft 10" that also meets the minimum bend radius and the allowable range of elasticity respectively included in the material characteristic data of the wire harness is calculated. At this time, as no material characteristic data is included in a new path layout provided from the car manufacturer, the material characteristic data is estimated based upon the positional information included in the new path layout. Therefore, a database which relates the shape of typical wire harnesses (corresponding to the positional information) and material characteristics is created by the part manufacturer beforehand by making tests. Approximate material characteristic data is selected based upon positional information included the new path layout provided from the car manufacturer, referring to the database. A twig having a shape shown by 13-2" in FIG. 11 is calculated and displayed using the material characteristic data. At this time, the twig to be an object is made as short as possible. In a step S63, the length information 13b2 can be displayed in the path layout draft 10" acquired as described above in a state in which the length information is added.

The result acquired as described above is stored on a portable record medium via the read/write memory 107, can be provided to the car manufacturer and can be also provided to the car manufacturer via the communication interface 106.

As described above, the very realistic path layout draft can be provided. Besides, the car manufacturer to which the path layout draft is provided can also easily grasp positional relation with an interference. The step S62 and related hardware correspond to a path layout draft output unit in claim, and the step S63 and related hardware correspond to a length information output unit in the claims.

As described above, according to the embodiment, the frequent modification of design is precisely processed and the design efficiency of the jig plate layout and the path layout draft in accordance with it can be enhanced.

In the embodiment, the example of the part manufacturer that provides the wire harness to the car manufacturer is described, however, the invention is not limited to this. For example, even if the part manufacturer in the embodiment is replaced with a department that provides a wire harness to a manufacturing department in the same company, the invention can be similarly applied. Besides, the trunk, the twig, the guide line, the design of length information and classification in color respectively shown in relation to the embodiment can be also suitably changed. In addition, it need scarcely be said that examples variously transformed in a range which does not deviate from the technical idea of the invention are also included in the invention.

As described above, according to the invention disclosed in claim 1, new path data related to a new path layout in which modification is required is acquired, the new path data and stored current path data are compared and the difference information is detected. Information that has an effect upon a current jig plate layout and is calculated based upon the difference information is added to the current jig plate layout and it is output. Therefore, a location to be modified of the current jig plate layout can be easily recognized and the design efficiency of a new jig plate layout is enhanced.

According to the invention, a new jig plate layout calculated based upon the acquired new path data is output, guide information for guiding a modifiable location calculated based upon the difference information of the new jig plate layout is added to the new jig plate layout and it is output. Therefore, the new jig plate layout can be easily and securely designed based upon the guide information.

According to the invention, new path data related to a new path layout in which modification is required is acquired, the new path data and stored current path data are compared and the difference information between both data is detected Besides, a new jig plate layout calculated based upon the acquired new path data is output. Guide information for guiding a modifiable location calculated based upon the difference information of the new jig plate layout is added to the new jig plate layout and it is output. Therefore, the new jib plate layout can be easily designed based upon the guide information and the design efficiency is enhanced.

According to the invention, as a new jig plate layout is modified according to an instruction for modifying the new jig plate layout utilizing guide information, the review of an optimum jig plate layout is facilitated.

According to the invention, as a path layout draft 10' that reflects modification in a new jig plate layout is also output, the realistic layout draft can be acquired.

According to the invention, as a path layout draft 10" based upon information related to the material characteristic of a wire harness estimated based upon the new path layout is output, the more realistic path layout draft can be acquired.

According to the invention, as the length information is added and it is output when the length in a new path layout is modified by a path layout draft, a further realistic path layout draft can be provided.

What is claimed is:

1. A wire harness design support system for supporting designing a path layout of a wire harness wired in a predetermined location and a jig plate layout for manufacturing the wire harness, comprising:
    a path data storing unit for storing at least current path data related to a current path layout;
    a jig plate data storing unit for storing at least current jig plate data related to a current jig plate layout;
    a path data acquiring unit for acquiring new path data related to a new path layout in which modification is required;
    a difference information detecting unit for comparing the new path data and the current path data and detecting difference information between both data; and
    a current jig plate layout output unit for adding information which is calculated based upon the difference information and has an effect upon the current jig plate layout, to the current jig plate layout calculated based upon the current path data, and outputting the current jig plate layout to which the information is added.

2. The wire harness design support system according to claim 1, further comprising:
    a new jig plate layout output unit for outputting a new jig plate layout calculated based upon the new path data; and
    a modification guide information output unit for adding guide information for guiding a modifiable location calculated based upon the difference information, to the new jig plate layout, and outputting the new jig plate layout to which the guide information is added.

3. The wire harness design support system according to claim 2, further comprising:
    a modification unit for modifying the new jig plate layout according to an instruction to modify the new jig plate layout utilizing the guide information.

4. The wire harness design support system according to claim 3, further comprising:

a path layout draft output unit for outputting a path layout draft that reflects modification in the new jig plate layout.

5. The wire harness design support system according to claim 4, wherein:

the path layout draft output unit outputs the path layout draft based upon information of material characteristics of a wire harness estimated based upon the new path layout.

6. The wire harness design support system according to claim 5, further comprising:

a length information output unit for adding length information to the path layout draft when length of the wire harness is modified in the new path layout and outputting the path layout drat to which the length information is added.

7. A wire harness design support system for supporting designing a path layout of a wire harness wired in a predetermined location and a jig plate layout for manufacturing the wire harness, comprising:

a path data storing unit for storing at least current path data related to a current path layout;

a jig plate data storing unit for storing at least current jig plate data related to a current jig plate layout;

a path data acquiring unit for acquiring new path data related to a path layout the modification of which is required;

a difference information detecting unit for comparing the new path data and the current path data and detecting difference information between both data;

a new jig plate layout output unit for outputting a new jig plate layout calculated based upon the new path data; and a modification guide information output unit for adding guide information for guiding a modifiable location calculated based upon the difference information of the new jig plate layout, to the new jig plate layout, and outputting the new jig plate layout to which the guide information is added.

8. The wire harness design support system according to claim 7, further comprising:

a modification unit for modifying the new jig plate layout according to an instruction to modify the new jig plate layout utilizing the guide information.

9. The wire harness design support system according to claim 8, further comprising:

a path layout draft output unit for outputting a path layout draft that reflects modification in the new jig plate layout.

10. The wire harness design support system according to claim 9, wherein:

the path layout draft output unit outputs a path layout draft based upon information of the material characteristics of a wire harness estimated based upon the new path layout.

11. The wire harness design support system according to claim 10, further comprising:

a length information output unit for adding length information to the path layout draft when length of the wire harness is modified in the new path layout, and outputting the new path layout draft to which the length information is added.

12. A method of supporting designing a path layout of a wire harness wired in a predetermined location and a jig plate layout for manufacturing the wire harness, comprising the steps of:

a path data storing step of storing at least current path data related to a current path layout;

a jig plate data storing step of storing at least current jig plate data related to a current jig plate layout;

a path data acquiring step of acquiring new path data related to a new path layout in which modification is required;

a difference information detecting step of comparing the new path data and the current path data and detecting difference information between both data; and a current jig plate layout output step of adding information which is calculated based upon the difference information and has an effect upon the current jig plate layout, to the current jig plate layout calculated based upon the current path data, and outputting the current jig plate layout to which the information is added.

13. A computer readable recording medium storing a program for supporting designing a path layout of a wire harness wired in a predetermined location and a jig plate layout for manufacturing the wire harness, the program causing a computer to execute the steps of:

a path data storing step of storing at least current path data related to a current path layout;

a jig plate data storing step of storing at least current jig plate data related to a current jig plate layout;

a path data acquiring step of acquiring new path data related to a new path layout in which modification is required;

a difference information detecting step of comparing the new path data and the current path data and detecting difference information between both data; and a current jig plate layout output step of adding information which is calculated based upon the difference information and has an effect upon the current jig plate layout, to the current jig plate layout calculated based upon the current path data, and outputting the current jig plate layout to which the information is added.

* * * * *